June 7, 1938.   J. B. NELSON   2,119,717
SHUTTER CONSTRUCTION
Filed May 6, 1936

INVENTOR.
John B. Nelson
BY
ATTORNEYS

Patented June 7, 1938

2,119,717

UNITED STATES PATENT OFFICE 2,119,717

SHUTTER CONSTRUCTION

John B. Nelson, Rochester, N. Y., assignor, by mesne assignments, to Eastman Kodak Company, Jersey City, N. J., a corporation of New Jersey Application May 6, 1936, Serial No. 78,152

6 Claims. (Cl. 95—60)

This invention relates to photography and more particularly to photographic shutters. One of the objects of this invention is to provide a shutter with a novel type of latch which is adapted to hold parts of the shutter for making prolonged exposures. Another object of my invention is to provide a shutter including a plunger mounted to move axially of the shutter to and from a position in which a latch will be positioned for making prolonged exposures. Another object of my invention is to provide a spring latch for prolonged exposures so arranged that the shutter blade may be moved in a normal path to make an exposure in one direction and will be restrained from movement in an opposite direction. Still other objects will appear from the following specification, the novel features being particularly pointed out in the claims at the end thereof.

Coming now to the drawing wherein like reference characters denote like parts throughout:

Figure 1:
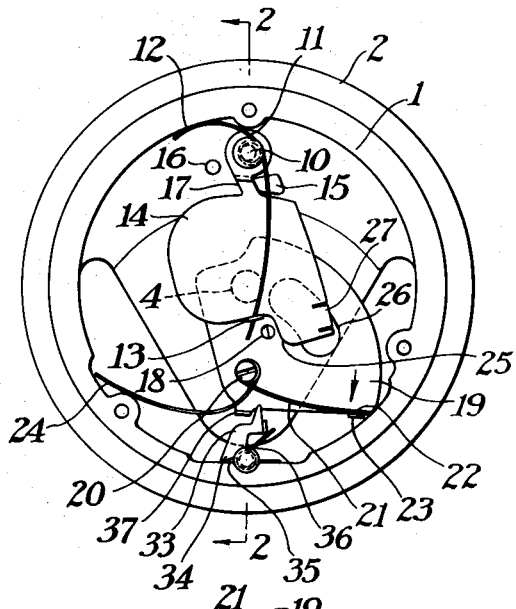
Fig. 1 is a plan view of a shutter mechanism constructed in accordance with and embodying a preferred form of my invention.
Figure 2:
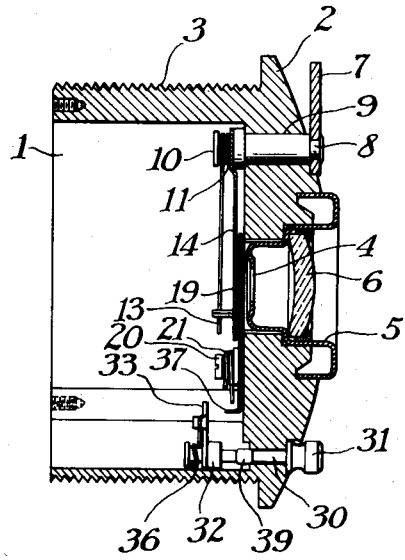
Fig. 2 is a section on line 2—2 of Fig. 1.

In accordance with the preferred embodiment of my invention shown in the drawing, the shutter casing may consist of an annular threaded member 1 having an integral shutter cover 2 and including an annular threaded portion 3 adapted to screw into a camera body in a well known manner.

The shutter casing may preferably be made of molded composition, and there is an exposure aperture 4 carried by the shutter cover 2 which is formed in an annular member 5 which is inserted in the front 2 of the shutter and which preferably carries the camera lens 6. In order to make an exposure, light passes through the lens 6 and through the aperture 4 when the shutter leaf and cover blade, to be hereinafter more fully described, are operated.

The shutter is provided with a trigger 7 carried by shaft 8 passing through an aperture 9 in the cover 2 and terminating in a headed stud 10 about which a light spring 11 is coiled, one end of the spring 12 resting against the casing and the other end of the spring 13 engaging the shutter cover 14 which is attached to the end of the stud 10. Each time the trigger 7 is depressed, the shutter cover 14 may be moved from its normal position shown in Fig. 1, in which it contacts with a stop 15, to a position in which it may contact with a pin 16.

It should be noted that the shutter cover is connected to the trigger shaft 8 by means of a narrow resilient neck 17 which permits the shutter blade to flex a sufficient distance axially to ride up over the beveled lug 18 carried by the shutter blade 19.

The shutter blade 19 is pivotally mounted upon a stud 20 about which a spring 21 is coiled, one end of which 22 engages a lug 23 carried by the shutter blade and the other end of which 24 engages a portion of the shutter casing. The spring normally tends to turn the shutter blade in the direction shown by the arrow in Fig. 1, in which the exposure opening 4 is covered by a portion of the shutter blade.

Figure 3:
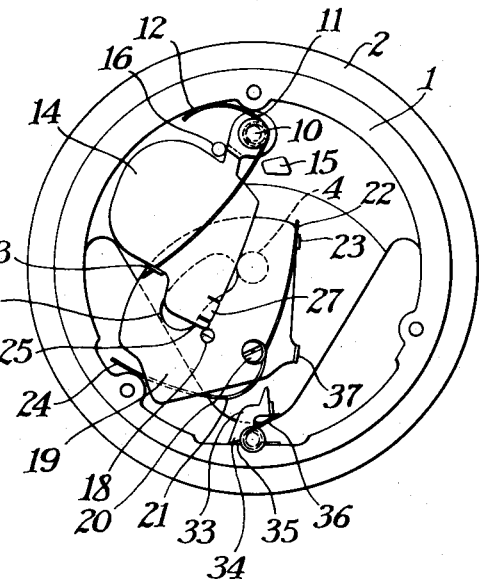
Fig. 3 is a view similar to Fig. 1 but with the parts in position to start an exposure.

In order to make an instantaneous exposure, the trigger 7 is pressed, turning the cover plate 14 so that the cam edge 25 of this member will engage the beveled stud 18 so as to swing the shutter blade 19 toward the position shown in Fig. 3. During the time the slot 26 in the shutter blade lies over the exposure aperture 4, the cover blade will lie over the exposure aperture so that in the first part of this movement, no exposure can be made.

When, however, the trigger is turned just beyond the position shown in Fig. 3, the cam surface 25 slips off of the beveled lug 18 on the shutter blade, and the shutter blade, under the impulse of its spring 21, will swing to the position shown in Fig. 1, thus causing the opening 26 to swing across the unobstructed exposure aperture 4 and make an instantaneous exposure. By releasing the trigger the spring coiled about the pivot 10 will cause the cover to move from the position shown in Fig. 3 to the position shown in Fig. 1. During this movement, an edge of the cover plate 14, which is beveled upwardly at 27, will engage and ride up over the beveled lug 18 on the shutter blade, enabling the cover plate to move to its initial position.

As thus far described, the shutter construction is well known.

The means for producing a prolonged exposure consists of a plunger 30 having an operating head 31 on the outside of the shutter cover 2 and carrying a shoulder 32 on the inside of this stud upon which a latch member 33 is pivotally mounted. This latch member is provided with a shoulder 34 which normally rests on an edge 35 of the shutter casing and which has a sliding engagement therewith. A spring 36 coiled about the shaft 30 tends to move the latch until the shoulder contacts with the shutter casing. However, this spring permits the latch to move freely in a reverse direction.

The spring latch is carried bodily by the plunger 30 and lies normally out of the path of an upstanding lug 37 carried by the shutter leaf. However, when it is desired to make a prolonged exposure, the operating head 31 is drawn out as shown in Fig. 5, thus bodily moving the entire spring latch inwardly into a position in which it will lie in the path of the upstanding lug 37.

Figure 4:
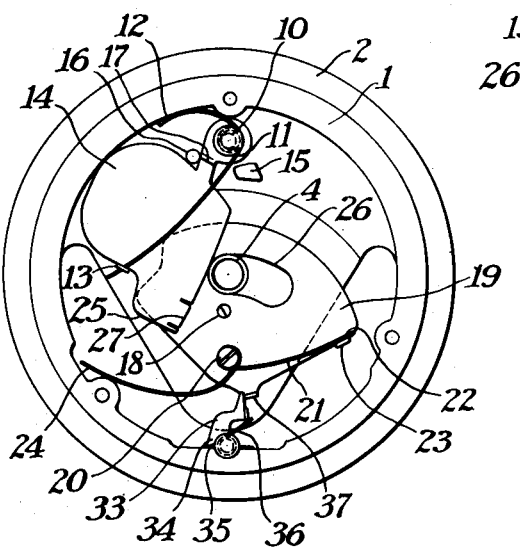
Fig. 4 is a view similar to Figs. 1 and 3 but with the shutter parts in position to make a prolonged exposure.

When in this position, if the shutter trigger is depressed the cam surface 25 will engage the beveled lug 18, as before, and move the shutter blade 19 from the position shown in Fig. 1 to that shown in Fig. 3. Slight further movement causes the slip-off, as before, and permits the shutter to swing toward the position shown in Fig. 1. However, this position cannot be reached because the shutter lug 37 will strike the spring latch 33 which forms a stop, since this latch cannot turn in a counterclockwise direction with reference to Fig. 4. Thus, the shutter blade 19 will be stopped with the slot 26 lying opposite the exposure aperture 4, and light may freely enter through the objective 6 until such a time as the trigger 7 is released. When this occurs, the beveled portion 27 of the shutter will ride up over the beveled lug 18 of the shutter blade and permit the cover plate 14 to return to its initial position shown in Fig. 1. However, the shutter blade will not return to its initial position, but is held in the inoperative position shown in Fig. 4 until the plunger 31 is depressed to move the spring latch 33 out of the path of lug 37.

If desired, a prolonged exposure can be terminated by merely pressing in the plunger 31 without releasing the shutter trigger 7, although this is somewhat more awkward than merely releasing the trigger 7 and then pushing in the plunger 31. It should be noted that the plunger 30 is provided with a small deformed area 39 which is of a size to frictionally engage the walls of the opening through which the plunger passes. This tends to hold the plunger in any set position by friction.

Figure 5:
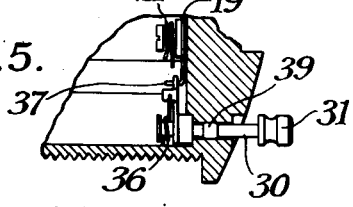
Fig. 5 is a fragmentary detail section showing the position of the stop arm when a prolonged exposure is to be made.

By this arrangement the plunger is not only retained in its set position, but, when the plunger is drawn out as shown in Fig. 5, it tends to call to the attention of an operator that the shutter is set for abnormal exposures rather than for the usual instantaneous type.

The operation of this shutter is extremely simple. To make an instantaneous exposure, the trigger 7 is depressed, moving the cover plate to cam the shutter blade to a slip-off position, which permits the shutter blade to return to its initial position under the impulse of its own spring, thus causing an exposure to be made as the slot 26 swings past the exposure aperture 4.

For exposures longer than instantaneous, the plunger 31 is drawn out from the shutter cover 2, so that the spring latch member 33 is moved into the path of the shutter blade lug 37. The trigger 7 is then operated, and the function of the parts are the same as for instantaneous exposures, except that the shutter blade 19 can only move towards its original position to the extent permitted by the spring latch 33, which forms a stop for the shutter blade and causes the exposure aperture 4 to be fully open when the blade comes to rest. Consequently, the exposure will continue until either the trigger 7 is released or the plunger 31 is pressed inwardly, flush with the shutter case.

What I claim as my invention and desire to be secured by Letters Patent of the United States is:

1. In a shutter for cameras, the combination with a support adapted to be made of molded material to constitute an apertured shutter casing, one aperture forming an exposure aperture and another aperture forming a bearing for a latch, a shaft frictionally engaging said bearing and being adapted to move axially therein, an operating knob carried by the shaft on the outside of the shutter support, a spring latch carried by the shaft on the inside of the support, a pivoted shutter blade mounted inside of the support, said latch being movable into and out of the path of said shutter moving about its pivot, shutter mechanism for moving said shutter blade carried by the shutter and including a trigger, said spring latch being mounted on said shaft in position to allow the shutter blade to move past the latch in one direction and to restrain movement thereof in an opposite direction when said operating knob is properly adjusted, whereby time exposures may be made.

2. In a shutter for cameras, the combination with a support adapted to be made of molded material to constitute an apertured shutter casing, one aperture forming an exposure aperture and another aperture forming a bearing for a latch, a shaft frictionally engaging said bearing and being adapted to move axially therein, an operating knob carried by the shaft on the outside of the shutter support, a spring latch carried by the shaft on the inside of the support, a pivoted shutter blade mounted inside of the support, said latch being movable into and out of the path of said shutter moving about its pivot, shutter mechanism for moving said shutter blade carried by the shutter and including a trigger, said spring latch being mounted on said shaft in position to allow the shutter blade to move past the latch in one direction and to restrain movement thereof in an opposite direction when said operating knob is properly adjusted, whereby time exposures may be made, said shaft having an enlarged portion always in contact with a portion of the support bearing and having a close fit therewith to frictionally hold the shaft in an operative or inoperative position in which the latch lies in or out of the path of the shutter blade.

3. In a shutter for cameras, the combination with a support adapted to be made of molded material to constitute an apertured shutter casing, one aperture forming an exposure aperture and another aperture forming a bearing for a latch, a shaft frictionally engaging said bearing and being adapted to move axially therein, an operating knob carried by the shaft on the outside of the shutter support, a spring latch carried by the shaft and located on the inside of the support, a pivoted shutter blade mounted inside of the support, said latch being movable into and out of the path of said shutter moving about its pivot, a second pivot spaced from the shutter pivot, a cover plate and a trigger movably mounted thereon, an aperture in the shutter blade, the cover plate being adapted to normally cover the exposure aperture, springs connecting the shutter blade to the casing and the cover plate to the casing, each tending to turn the parts in one direction, said shutter plate including a lug positioned so that when restrained by the spring latch the exposure aperture and shutter blade apertures may register and a prolonged exposure may result, said shaft being movable axially in the shutter bearing to move the latch out of the path of the shutter blade, whereby instantaneous exposures may be made.

4. In a shutter for cameras, the combination with a support including an exposure aperture, of a shutter blade pivoted thereto and movable to cover and uncover the aperture, a trigger pivotally attached to the support, a cover plate attached to the trigger, the said pivots supporting the shutter blade and trigger being located on opposite sides of the exposure aperture, cooperating elements on the cover and shutter blade by which the former moves the latter when moving in one direction until a slip-off occurs due to the spaced pivotal mounts for the parts, beveled surfaces on the cooperating elements positioned so that the cover may ride idly over the shutter blade when moving in an opposite direction whereby the cover may not move the shutter blade, a spring anchored on the support and on the shutter blade normally tending to turn the shutter blade to make an exposure, an axially shiftable spring latch mounted on the shutter for movement into the path of the shutter blade, means included in the latch permitting the shutter blade to pass the latch in tensioning the spring, said latch being positioned to hold the shutter blade against movement after partially completing its return movement under the impulse of said spring, said axially shiftable mount extending outside the support and constituting a means for moving the spring latch bodily from the path of the shutter blade.

5. In a shutter for cameras, the combination with a support including an exposure aperture, of a shutter blade pivoted thereto and movable to cover and uncover the aperture, a trigger pivotally attached to the support, a cover plate attached to the trigger, the said pivots supporting the shutter blade and trigger being located on opposite sides of the exposure aperture, cooperating elements on the cover and shutter blade by which the former moves the latter when moving in one direction until a slip-off occurs due to the spaced pivotal mounts for the parts, beveled surfaces on the cooperating elements positioned so that the cover may ride idly over the shutter blade when moving in an opposite direction whereby the cover may not move the shutter blade, a spring anchored on the support and on the shutter blade normally tending to turn the shutter blade to make an exposure, an axially shiftable spring latch comprising a shaft frictionally engaging and extending through an aperture in the shutter to the outside of the support and adapted to be held in set positions through friction, the spring latch being mounted to pass the shutter blade in one direction and prevent its movement in an opposite direction when said axially adjustable shaft is moved to an operative position in the path of the shutter blade.

6. In a shutter for cameras, the combination with a support including an exposure aperture, of a shutter blade pivoted thereto and movable to cover and uncover the aperture, a trigger pivotally attached to the support, a cover plate attached to the trigger, the said pivots supporting the shutter blade and trigger being located on opposite sides of the exposure aperture, cooperating elements on the cover and shutter blade by which the former moves the latter when moving in one direction until a slip-off occurs due to the spaced pivotal mounts for the parts, beveled surfaces on the cooperating elements positioned so that the cover may ride idly over the shutter blade when moving in an opposite direction whereby the cover may not move the shutter blade, a spring anchored on the support and on the shutter blade normally tending to turn the shutter blade to make an exposure, an axially shiftable spring latch comprising a shaft frictionally engaging an aperture in and extending through the shutter and adapted to be held in set positions through friction, a spring latch mounted to pass the shutter blade in one direction and prevent its movement in an opposite direction when said axially adjustable shaft is moved to an operative position in the path of the shutter blade for time exposures, in which position said shaft projects from the outside of said support, whereby an operator's attention is drawn to the time setting of the shutter and from which position the shaft may be moved axially to move the latch from the path of said shutter blade to set the shutter for instantaneous exposures.

JOHN B. NELSON.